No. 782,635. PATENTED FEB. 14, 1905.
G. W. WINTERS.
TYPE WRITER.
APPLICATION FILED OCT. 28, 1903.
5 SHEETS—SHEET 4.
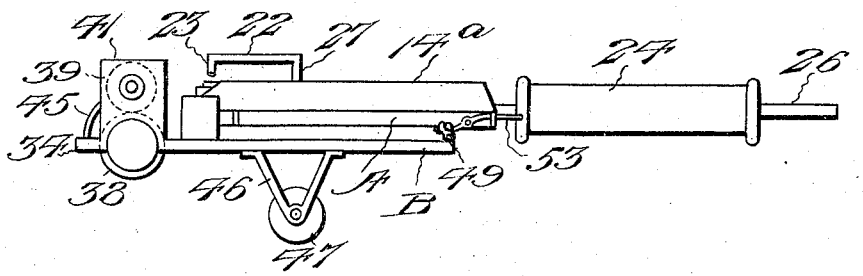
Fig. 4.
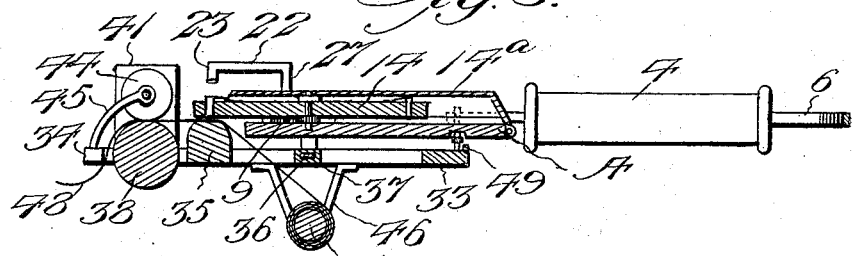
Fig. 5.
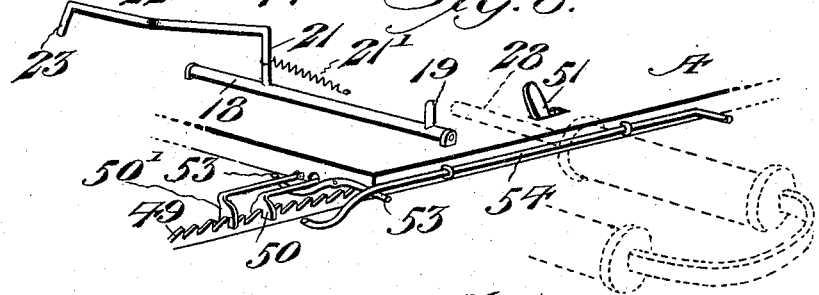
Fig. 6.
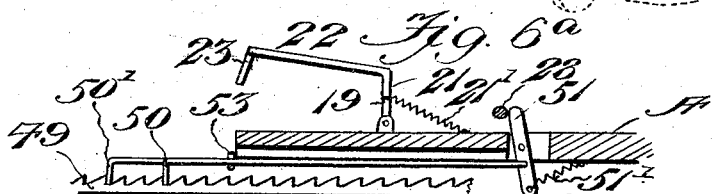
Fig. 6ª
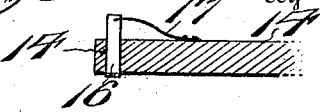
Fig. 7.
Witnesses
Wm. J. North
W. H. Clarke.
Inventor
George W. Winters,
By Victor J. Evans
Attorney No. 782,635. PATENTED FEB. 14, 1905.
G. W. WINTERS.
TYPE WRITER.
APPLICATION FILED OCT. 28, 1903.
5 SHEETS—SHEET 5.
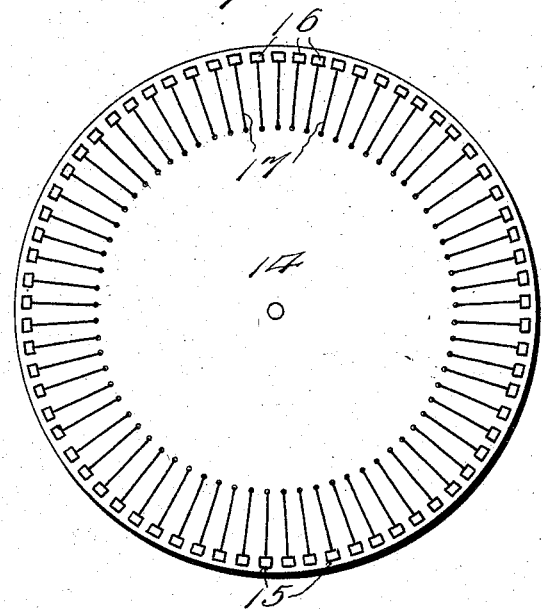
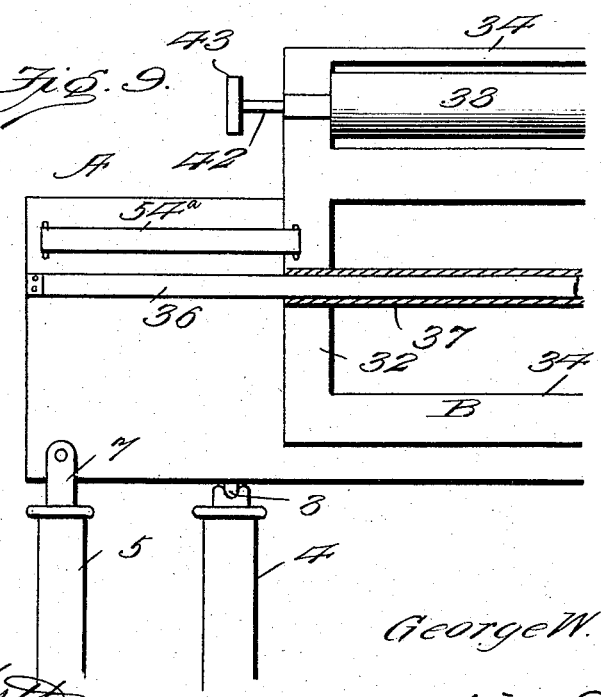
Witnesses
Inventor
George W. Winters
By Victor J. Evans
Attorney No. 782,635. Patented February 14, 1905.

UNITED STATES PATENT OFFICE.

GEORGE W. WINTERS, OF FITZGERALD, OKLAHOMA TERRITORY, ASSIGNOR OF ONE-HALF TO CHARLES BABSON, OF BOSTON, MASSACHUSETTS.

TYPE-WRITER.

SPECIFICATION forming part of Letters Patent No. 782,635, dated February 14, 1905.

Application filed October 28, 1903. Serial No. 178,951.

*To all whom it may concern:*

Be it known that I, GEORGE W. WINTERS, a citizen of the United States, residing at Fitzgerald, in the county of Woodward and Territory of Oklahoma, have invented new and useful Improvements in Type-Writers, of which the following is a specification.

My invention relates to improvements in type-writing machines; and the object is to provide a hand-machine which is of light weight and small dimensions and which possesses all the requisites of certainty and efficiency in manipulation and mechanical action.

With these objects in view the invention embodies the construction of parts and their aggroupment in operative combination, as will be hereinafter fully specified and the novelty claimed particularly pointed out and distinctly asserted.

I have fully and clearly illustrated the invention in the annexed drawings, to be taken as a part of this specification.

Figure 1:
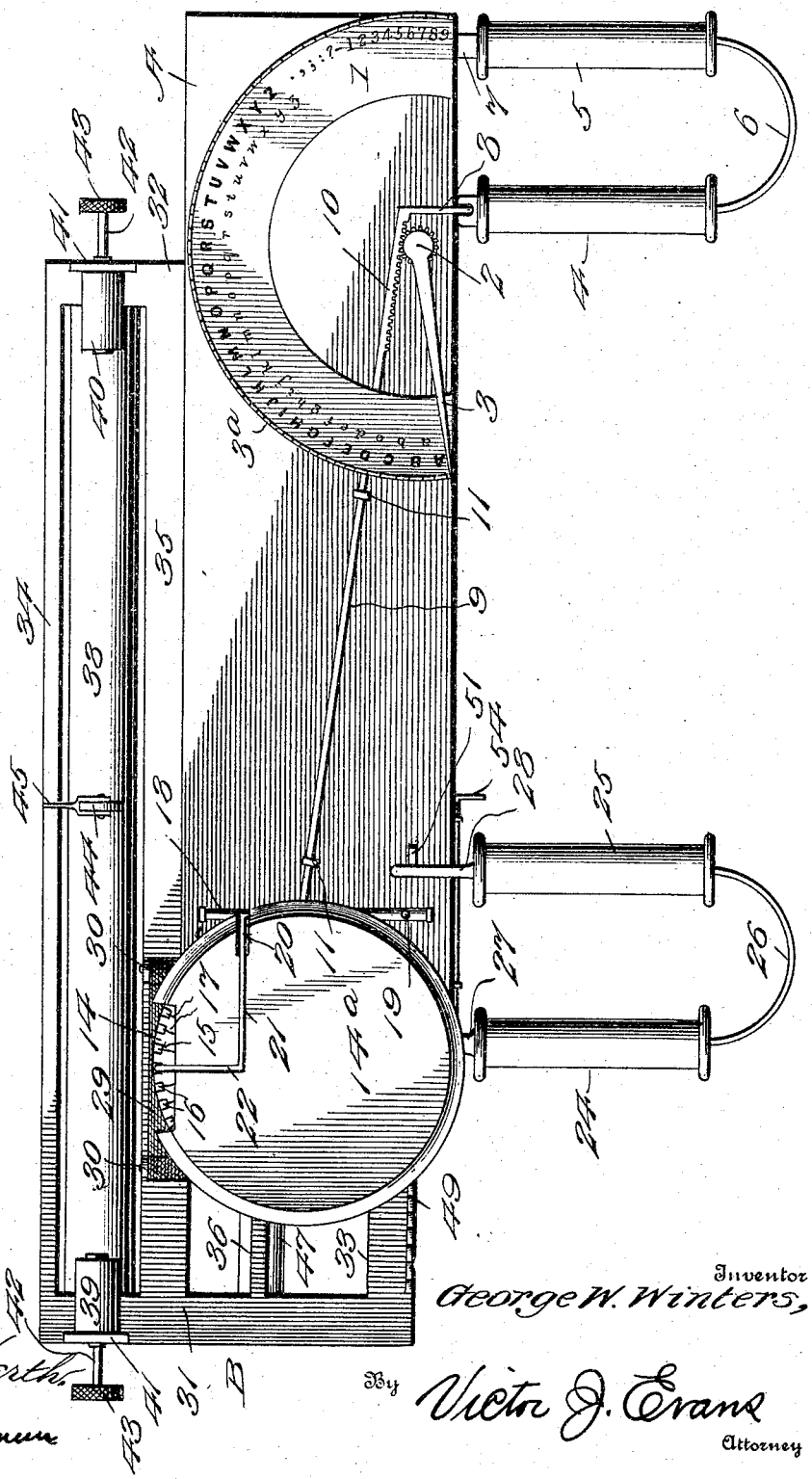
Figure 2:
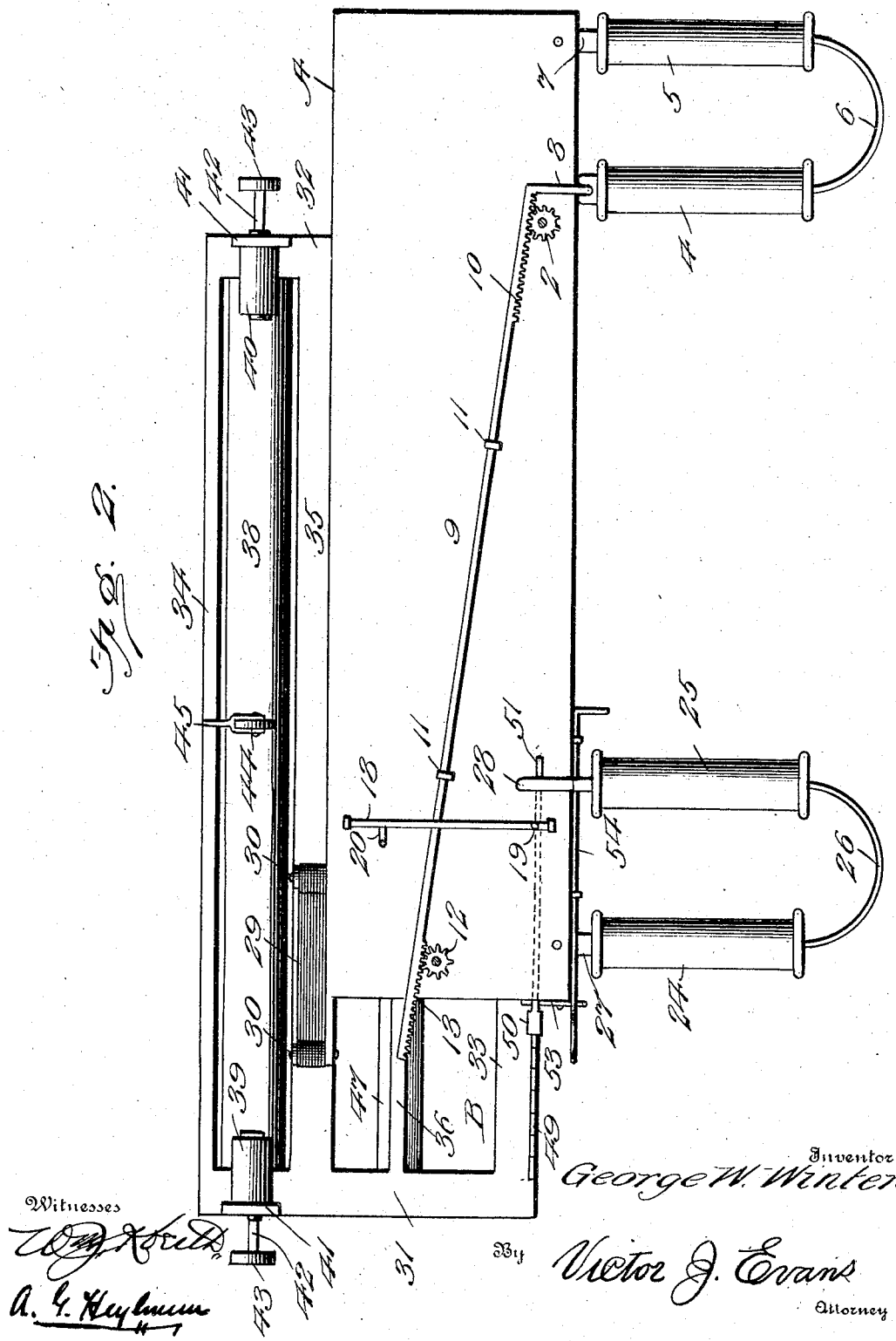
Figure 3:
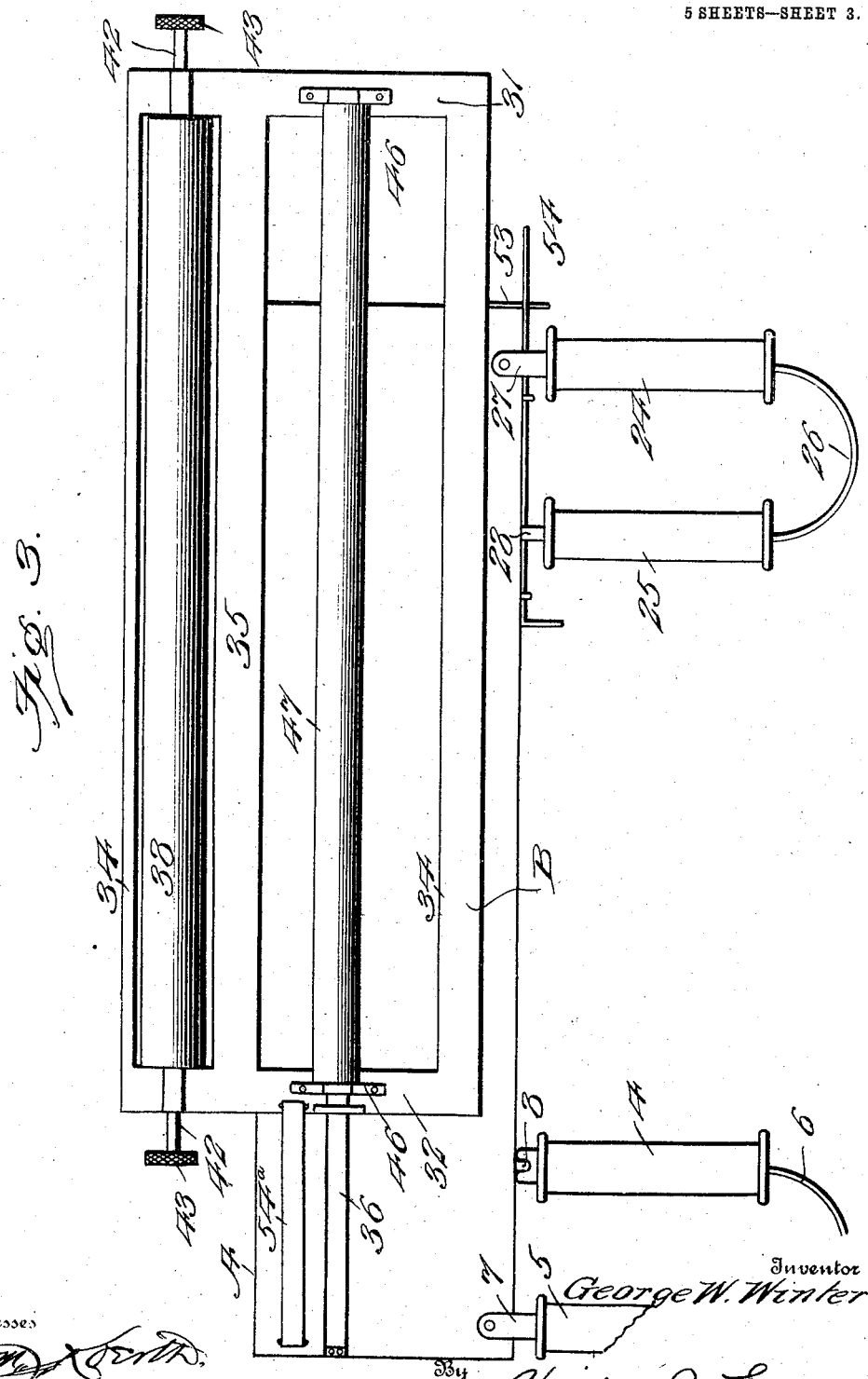

Reference being had to the drawings, Figure 1 is a top plan view of the complete machine, showing the hand-grasps by which the machine is actuated, the index-plate, the type-wheel, the type-bar, and the paper carriage and rollers. Fig. 2 is a plan view similar to Fig. 1, with the type-wheel and index-plate removed, showing the actuating rack-bar. Fig. 3 is a bottom plan view showing the roller on which the paper may be rolled and thence fed to the feed-rollers. Fig. 4 is an end view of the machine. Fig. 5 is a transverse section of the parts centrally through the type-wheel. Fig. 6 is a detail perspective view of the carriage-feeding mechanism and the type-bar-actuating devices. Fig. 6ª is a detail sectional view of the carriage-feeding mechanism. Fig. 7 is a detail section of a portion of the type-wheel, showing the arrangement of the types therein. Fig. 8 is a plan view of the type-wheel with the types disposed therein and the return-springs connected thereto. Fig. 9 is a bottom face view of a portion of the frame-plate and of the carriage, showing the tube secured to the bottom face of the plate and the carriage-bar arranged therein.

In the drawings similar parts appearing in the several illustrations are designated by similar reference notations.

A designates a rectangular plate of such area as may suit it to the purpose intended and on which the members or elements of the machine are secured and carried. I intend generally to make this plate eight inches long and one inch wide, but of course do not desire to be limited to these precise dimensions. To the right-hand end of the plate A is mounted an index-plate 1, made of a half-circular plate and whereon are placed in radial arrangement the letters of the alphabet and such other essential characters as may be selected for convenience in machines of this character, substantially as seen in Fig. 1 of the drawings. On the plate A, at the center of the circle prescribed by the curve of the index-plate, is journaled a pinion 2, which carries a hand or pointer 3, designed to indicate the letters or characters intended to be produced on the paper. The pointer 3 at its outer end portion rides over and engages in notches made in a curved edge plate 3ª, the notches being coincident or in alinement with the letters and characters on the plate 1, so that the pointer will stop directly over the desired character or letter.

4 5 constitute a U-shaped hand-grasp consisting of two members having their outer ends connected by the bow-spring 6, the member 5 being pivotally connected to the plate A, as at 7, and the member 4 having its inner or upper end connected to an end piece 8, rigid with a reciprocable bar 9, formed with a rack 10, which engages with the pinion 2. The bar 9 slides in keepers 11, as seen in Figs. 1 and 2 of the drawings, and is positioned to suit its connections at its outer end, as will be hereinafter stated. In the plate A, at the left-hand end portion, is journaled a pinion 12, a duplicate of the pinion 2. The pinion 12 is engaged by a rack 13, formed on the bar 9, and is actuated thereby. On the shaft of the pinion 12 is centrally mounted the type-wheel 14, rotated by the pinion. This type-wheel 14 consists of a circular plate of the requisite diameter and thickness and is provided with the required number of vertical type slots or holes 15, radially arranged and located adjacent to its circumferential edge, and in these type-slots are slidably positioned the types 16, which after depression by the type - bar, as hereinafter specified, are raised to normal position by spring arms or rods 17, having their inner ends secured to points on the type-wheel and their outer ends secured to the types, substantially as shown in the drawings. The type-wheel for convenience is covered with a disk 14$^a$, substantially as seen in the drawings. It will now be seen that when the index-hand is turned through the compression of the hand-grasp 4 5 and rotation of the pinion 2 to indicate the required character the bar 9 is moved, so that the rack 13 rotates the pinion 12, which turns the type-wheel synchronously with the index-arm and brings the required type into position to be in the path of the type-hammer.

On the plate A is journaled a suitable rock-shaft 18, from which projects a pin 19, and at a proper point on the rock-shaft 18 is arranged the stem 21 of the type-hammer. The type-hammer consists of the stem 21, an extension 22 at right angles to the stem and on the diametrical line of the type-wheel, as shown in Figs. 1 and 4 of the drawings, and at the free end of the part 22 the hammer-piece is directed downwardly, as at 23, the end impending directly over the type to be struck. Any suitable means, such as a spring 21', may be connected with the stem 21 in order normally to hold the hammer in elevated position.

24 25 designate the U-shaped hand-grasp for the left hand of the operator, consisting of two cylindrical members united at their outer ends by a bowed spring 26. The member 24 of the hand-grasp is pivotally connected to the plate A by a lug 27, and the member 25 is left free and is provided with an extension 28, which contacts with the stud or finger 19 and actuates the rock-shaft to throw the type-hammer into contact with the types.

29 designates the inking-ribbon, mounted on spools 30, projecting laterally from and carried by the plate A, substantially as seen in the drawings.

B designates the carriage or sliding frame, which consists of a suitable rectangular frame of the same length as the plate A. The carriage-frame is made up of end pieces 31 32, side bars 33 34, intermediate piece 35, constituting the platen-bar, and a round carriage-bar 36. The carriage-bar 36 is slidingly disposed in a tube 37, fixed at the proper position on the rear face of the plate A, as indicated in the drawings. In the space between the bars 34 and 35 is journaled the paper-feed roller 38, the paper being held thereto by short rollers 39 40, journaled in suitable uprights 41, the paper-roller having its journals extended, as at 42, and provided with thumb-pieces 43, by which the roller is turned and the paper drawn between the rollers, and the line-spacing thus effected as may be desired. A small roller 44 may be mounted on an arm 45, adjustably carried on the bar 34 of the carriage, the purpose being to provide means to hold one end of envelops when addressing them. To the rear face of the carriage may be secured supports 46, wherein is journaled a roller 47, on which may be arranged a roll of paper 48, which may be led through the feed-rollers and the writing impressed thereon. Single or separate sheets may be used instead of the roll. The paper 48 is fed from the front up over the platen-bar 35, thence over the roller 38, and under the end rollers 39. The bar 33 of the carriage is formed with a ratchet 49, having teeth each with a straight edge and an inclined edge, said teeth being engaged by a pawl 50, which is pivoted to the lower end of a rocking arm or lever 51, pivotally mounted in a slot in the plate A, with its upper end in the path of the extension 28 of the hand-grasp 24 25. A spring 51', attached to the lower end of the lever 51 and to the plate A, serves to retract the pawl 50 each time it is actuated by the extension 28 of the hand-grasp 24 25. An auxiliary pawl 50', pivoted on the plate A, engages the teeth of the rack and prevents backward movement of the carriage when the pawl 50 is retracted preparatory to advancing the carriage. To release the pawls 50 and 51', so that the carriage may be drawn back, a finger 53 is pivotally secured to the plate A, with its inner portion extending under the pawls and its outer portion extending under a sliding rod 54, which has its end curved, as shown, so that when the rod is slid to the right the curved part will ride on and tilt the finger 53 and lift the pawls from engagement with the rack 49, and the carriage may then be pushed back manually.

If desired, a suitable spring or elastic band 54$^a$ (see Figs. 3 and 9) may be employed to effect the return movement of the carriage, it being understood that the action of the same cannot take place until the pawls 50 and 50' have been lifted free of the rack 49 in the manner described.

The functions and particular operations of the associated elements have been stated in the respective descriptions; but the combined operation and the operative manipulations may be stated as follows: Preliminary to use the paper is carried from the paper-roll or a single sheet inserted in place thereof and arranged over the platen-bar, thence over the main feed-roller, and under the short end rollers mounted at the end of the main roller. The operator then grasps with the right hand the hand-grasp at the right-hand end of the machine and compresses the hand-grasp until the pointer reaches the letter required. This movement through the medium of the rack on the left-hand end of the bar 9 rotates the pinion 12 and coincidently turns the type-wheel to stand at the point to bring the selected type directly into the path of the type-hammer. The operator then compresses the left-hand hand-grasp, the extension of which strikes the pin 19 of the rock-shaft and turns the shaft, so as to cause the hammer to strike the type and make its impression on the paper. On the release of the right-hand grasp the index is returned to initial point, and with it the type-wheel. The left-hand grasp is then released and the extension 28 thereof springs back against and encounters the rock-arm 51, thereby shoving the pawl 50 forward and moving the carriage forward one notch or the distance requisite for the next impression, the spring 51' serving to retract the pawl 50 each time it is actuated. It will be understood that the auxiliary pawl 50' rides over the rack 49 as the pawl 50 advances the carriage in a step-by-step manner. Furthermore, it will be understood that said auxiliary pawl 50' prevents the spring 54$^a$ from drawing the carriage backward when the pawl 50 is retracted. The next movement of the right-hand grasp can then be made and the same steps above stated be repeated, and so on until the words of that line are completed. When by means of one of the thumb-pieces 43 the paper is turned to position for the next line, the carriage may then be returned to the initial point or stopped at such point, as may be desired.

It will be perceived that the hand-grasps being pivotally connected to the frame may be turned back on their pivots and lie upon or parallel with the frame-plate of the machine when not in use and the whole machine thus be arranged to be carried in the pocket of a garment.

It will be understood that the feeding movements of the carriage take place from right to left, and in effecting such movements the pawl 50 successively engages with the straight edges of the teeth of the ratchet 49, whereas the pawl successively glides over the inclined edges of said teeth on its return movements, each of these edges serving to lift the pawl to cause it to drop behind the next succeeding straight edge, all as will be apparent.

Having thus fully described the invention, what I claim as new is—

1. In a type-writing machine, an index-plate, a rotatable pointer to sweep said plate, a rotatable type-wheel, types slidably disposed therein, a hand-grasp, means actuated by the hand-grasp to operate the pointer and type-wheel in unison, and means to depress said type in the type-wheel, said hand-grasp comprising a stationary leg and a movable leg and a spring connecting the two.

2. In a type-writing machine, a stationary plate, a movable paper-carriage mounted thereon, a semicircular index-plate on said stationary plate, a rotatable pointer to sweep the index-plate, a rotatable type-wheel, depressible types in said wheel, means to restore each type to normal position after depression thereof, and means to rotate the type-wheel and the pointer in unison, comprising a stationary member and a movable member and a spring connecting the two.

3. In a type-writing machine, a stationary plate, a movable paper-carriage mounted thereon, a semicircular index-plate on the stationary plate, a rotatable index-pointer to sweep over the index-plate, a rotatable type-wheel, depressible type in said wheel, means to depress the type, means to restore the type after depression thereof, duplicate pinions, a reciprocable rack-bar engaging said pinions to rotate the index-pointer and type-wheel in unison, and a compressible hand-grasp for operating said rack-bar.

4. In a type-writing machine, a relatively stationary plate, a movable paper-carriage mounted thereon, a semicircular index-plate, a rotatable index-pointer on the index-plate, a rotatable type-wheel, depressible types in the type-wheel, means to depress the types, means to restore them after depression, a U-shaped spring hand-grasp having one leg pivotally secured to the stationary plate, and means substantially as described connected to the free leg of the U-shaped hand-grasp to operate the type-wheel and the index-pointer in unison.

5. In a type-writing machine, a relatively stationary plate a circular index-plate mounted thereon, a pinion mounted on the stationary plate centrally to the index-plate a pointer carried by the pinion, a second pinion mounted on the stationary plate, a type-wheel carried by this pinion, depressible types in the type-wheel, springs to lift the types after depression, a rack-bar to rotate the pinions in unison, and a U-shaped spring hand-grasp having one leg pivotally connected to the stationary plate, and the other fastened to the rack-bar.

6. In a type-writing machine, the combination with a relatively stationary plate, a movable paper-carriage mounted thereon, and a rotatable type-wheel, of a type-hammer to strike the type in said wheel, and a rock-shaft and a U-shaped compressible hand-grasp for actuating said hammer.

7. In a type-writing machine, the combination with a relatively stationary plate, a movable paper-carriage mounted on the plate, and a rotatable type-wheel, of a rock-shaft journaled on the plate, a type-hammer extending at right angles therefrom, and a U-shaped spring hand-grasp having one leg secured to the plate, and the other leg adapted to engage the rock-shaft and actuate the type-hammer.

8. In a type-writing machine, the combination with a relatively stationary plate, a movable paper-carriage mounted thereon, having a ratchet along one edge, and a rotatable type-wheel, of a rock-shaft journaled on the plate, a type-hammer extending therefrom, a U-shaped spring hand-grasp having one leg secured to the plate and the other leg arranged to engage the rock-shaft, a pawl to engage the ratchet of the carriage, and a pivotally-mounted spring-controlled lever connected to the pawl in the path of the free leg of the hand-grasp to actuate the pawl and push the carriage forward.

9. In a type-writing machine, the combination with a relatively stationary plate, a movable paper-carriage mounted thereon and having a ratchet along one edge, and a rotatable type-wheel provided with depressible types, a rock-shaft journaled on the plate, a type-hammer extending therefrom, a U-shaped spring hand-grasp having one end secured to the plate and the other leg arranged to engage the rock-shaft, a pawl to engage the ratchet of the carriage, a pivotally-mounted lever connected to the pawl in the path of the free leg of the hand-grasp to actuate the pawl and push the carriage forward, and means to lift the pawl from the ratchet.

In testimony whereof I affix my signature in presence of two witnesses.

GEORGE W. WINTERS.

Witnesses:
M. B. SCHMACHTENBERGER,
L. O. MABEY.